United States Patent
Parrini et al.

(10) Patent No.: US 12,419,455 B2
(45) Date of Patent: Sep. 23, 2025

(54) FILTER HOLDER FOR ESPRESSO COFFEE MACHINE AND MACHINE EQUIPPED WITH SUCH FILTER

(71) Applicant: SIMONELLI GROUP S.P.A., Belforte del Chienti (IT)

(72) Inventors: Mauro Parrini, Porto Sant'Elpidio (IT); Claudio Enrico Cingolani, Camerino (IT)

( * ) Notice: Subject to any disclaimer, the term of this patent is extended or adjusted under 35 U.S.C. 154(b) by 580 days.

(21) Appl. No.: 17/929,549

(22) Filed: Sep. 2, 2022

(65) Prior Publication Data

US 2023/0071202 A1   Mar. 9, 2023

(30) Foreign Application Priority Data

Sep. 3, 2021   (IT) .................. 102021000022868

(51) Int. Cl.
*A47J 31/06*   (2006.01)

(52) U.S. Cl.
CPC ....... *A47J 31/0663* (2013.01); *A47J 31/0684* (2013.01)

(58) Field of Classification Search
CPC .............................. A47J 31/46; A47J 31/4464
See application file for complete search history.

(56) References Cited

U.S. PATENT DOCUMENTS

| 1,362,521 | A | * | 12/1920 | Zadora | F16L 37/248 |
| | | | | | 285/361 |
| 8,826,804 | B2 | * | 9/2014 | Remo | A47J 31/0657 |
| | | | | | 99/302 R |
| 12,121,175 | B2 | * | 10/2024 | Della Pietra | A47J 31/303 |
| 2009/0205502 | A1 | * | 8/2009 | Carbonini | A47J 31/52 |
| | | | | | 99/280 |
| 2012/0266754 | A1 | * | 10/2012 | Bambi | A47J 31/4464 |
| | | | | | 99/293 |
| 2018/0010362 | A1 | * | 1/2018 | Terei | E05B 3/06 |

FOREIGN PATENT DOCUMENTS

DE            4037366 A1 *   1/2000 .............. A47J 31/36

* cited by examiner

*Primary Examiner* — Woody A Lee, Jr.
(74) *Attorney, Agent, or Firm* — Egbert, McDaniel & Swartz, PLLC

(57) ABSTRACT

Filter holder for espresso coffee machines having a cup-shaped body of circular profile, suitable for internally housing the filter, as well as a pouring device of the beverage disposed under the cup-shaped body and provided with at least one pouring spout, the filter holder being provided with connections for connecting the pouring device to the cup-shaped body, wherein the connections enable a bayonet coupling between the pouring device and the cup-shaped body.

8 Claims, 5 Drawing Sheets

FILTER HOLDER FOR ESPRESSO COFFEE MACHINE AND MACHINE EQUIPPED WITH SUCH FILTER

CROSS-REFERENCE TO RELATED APPLICATIONS

Not applicable.

BACKGROUND OF THE INVENTION

1. Field of the Invention

The present patent application for industrial invention relates to an improved filter holder for an espresso coffee machine, and to an espresso coffee machine equipped with such an improved filter.

2. Description of Related Art Including Information Disclosed Under 37 CFR 1.97 and 37 CFR 1.98

From a physical viewpoint, espresso coffee is a beverage that is obtained by percolating hot water under pressure for about 25 seconds through a layer of roasted, ground and pressed coffee; while passing through the coffee powder, the water pressure (of about 9 atmospheres) is exhausted and the beverage is delivered at atmospheric pressure. The method used for making an espresso coffee differs from the other methods mainly in the use of a high water pressure and in the temperature that does not reach the boiling point.

A traditional espresso coffee machine includes a dispensing unit of pressurized hot water that is suitable for being interfaced with a filter holder containing ground coffee.

The dispensing unit comprises a hollow body that is internally provided with a ring with a lower circular mouth which is coupled with the filter holder in a typical bayonet coupling mode implemented by means of radial tabs obtained on the outside of the body of the filter holder and suitable for penetrating and sliding in semi-annular guide grooves obtained inside said mouth of the body.

In order to engage the filter holder in said mouth, firstly it is necessary to make the filter holder translate from down upwards, in such a way to engage the filter holder in said ring, and to rotate the filter holder in such a way to couple the filter holder with the ring.

As it is well known, the filter holder includes a handle that is grabbed by the operator to easily and quickly perform the manual operations that are to be executed every time the beverage is dispensed in order to repeatedly engage and disengage the filter holder with/from the dispensing unit.

The body of the filter holder is shaped as a circular cup so as to accommodate the filter, which consists in a circular tub suitable for containing a compact dose of coffee powder. The bottom of the tub is provided with small holes suitable for holding the coffee powder and allowing the percolation of the water supplied by the dispenser unit. The beverage drips under and out of the body of the filter holder through a discharge nozzle that projects vertically from the lower side of the bottom wall of said cup-shaped body.

The pouring of the beverage from the cup-shaped body of the filter holder into the cup used to drink the beverage is performed by means of a pouring device provided with pouring spouts and connection means for its connection under said cup-shaped body.

In particular, said pouring device has a cylindrical body suitable for receiving said discharge nozzle.

The most typical connection means include an external thread of the discharge nozzle and an internal thread of the mouth of said cylindrical body whereby the pouring device is practically screwed to the cup-shaped body of the filter holder. However, such a screwing system is impaired by a drawback consisting in the fact that, at the end of the screwing travel, the pouring spout(s) may not be oriented in the appropriate direction to let the beverage drip properly into the cups below.

In such a case, the operator must force the screwing with a tool until said spouts are in the correct direction.

It is obvious that when the pouring device must be disengaged from the body of the filter holder—for example, for cleaning or repair work—the unscrewing operation will be equally difficult because of said previous forced coupling, with the risk of damaging the threads over time, making the entire filter holder unusable.

Precisely in view of the said drawback, different connection means have been proposed to enable a simple forced coupling of male-female type, whereby said cylindrical body of the pouring device is simply inserted on the outside of the said discharge nozzle with the interposition of a friction ring suitable for causing the forced insertion of the nozzle inside the cylindrical body.

However, such a fixing system has not proved to be entirely free of drawbacks because said friction ring may lose its anti-slip properties over time due to the thermal stress to which it is subjected and to the mechanical stress experienced every time the pouring device is engaged and disengaged, with the risk for the pouring device to slip downwards and fall onto the ground by gravity.

BRIEF SUMMARY OF THE INVENTION

It is precisely from the critical observation of the fixing systems of the prior art that the improved filter holder according to the invention was devised with the purpose to ensure the safe and easy engagement and disengagement of the pouring device with respect to the body of the filter holder, precisely ensuring that, when the engagement is completed, the pouring spouts are oriented in the correct direction.

These purposes are achieved in accordance with the invention with the features listed in the appended independent claim 1.

Advantageous achievements appear from the dependent claims.

In brief, the improved filter holder according to the invention includes connection means that enable a bayonet coupling of the pouring device under the body of the filter holder.

More particularly, said pouring device comprises teeth provided at the top with an enlarged head, which are suitable for being inserted and slide into respective seats obtained on the lower side of said cylindrical body, said seats being characterized by the fact that they comprise an inlet slot shaped like a keyhole with an eye, from which a slot with lower width begins.

BRIEF DESCRIPTION OF THE SEVERAL VIEWS OF THE DRAWINGS

For the sake of explanatory clarity, the description of the improved filter holder and of the espresso coffee machine according to the invention continues with reference to the appended drawings, which have only illustrative and non-limiting value, wherein.

DETAILED DESCRIPTION OF THE INVENTION

Figure 1:
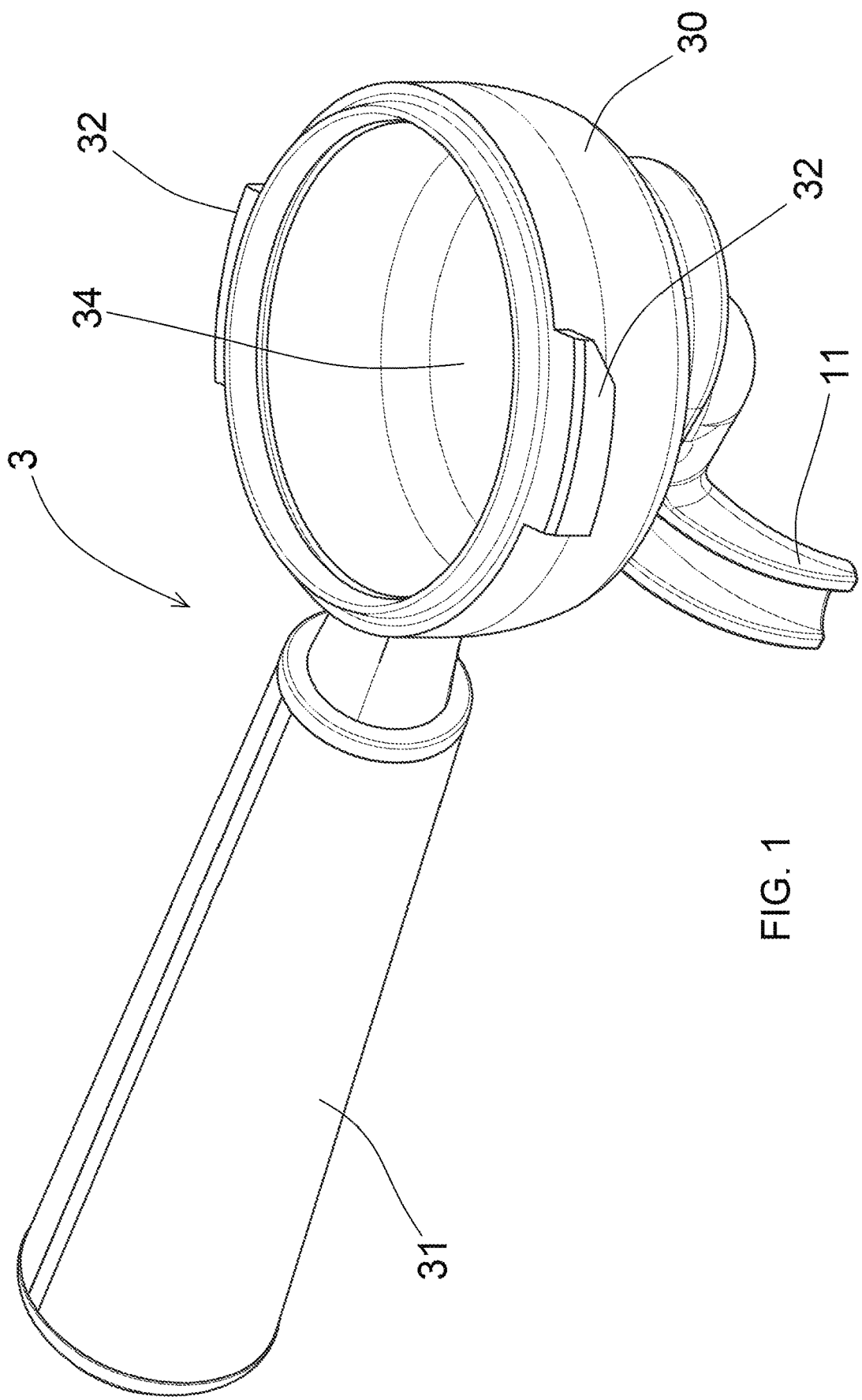
FIG. 1 is a three-dimensional top view of the improved filter holder according to the invention, wherein the pouring device is mounted.

Referring to FIG. 1, according to a traditional construction technique, the filter holder (3) according to the invention comprises a circular cup-shaped body (30), externally equipped with a handle (31) that is grabbed by the operator to easily and quickly perform the manual operations that are to be executed every time the beverage is dispensed in order to engage and disengage the filter holder (3) with respect to the seat provided in the espresso coffee machine.

The cup-shaped body (30) of the filter holder (3) is suitable for exactly accommodating the filter, which is not shown in the appended figures because said filter does not fall within the scope of the present invention.

Said filter consists in a circular tub suitable for receiving a compact dose of ground coffee powder and provided with a bottom with small holes suitable for holding the coffee powder and for allowing the percolation of water through the coffee powder into said cup-shaped body (30).

Referring to FIG. 1, the filter holder (3) comprises a first and a second tab (32) projecting radially outward from the cup-shaped body (30), through which said cup-shaped body (30) can be attached in bayonet coupling mode to the relevant seat, where the hot, pressurized water produced by the boiler provided in the espresso coffee machine flows.

Figure 2:
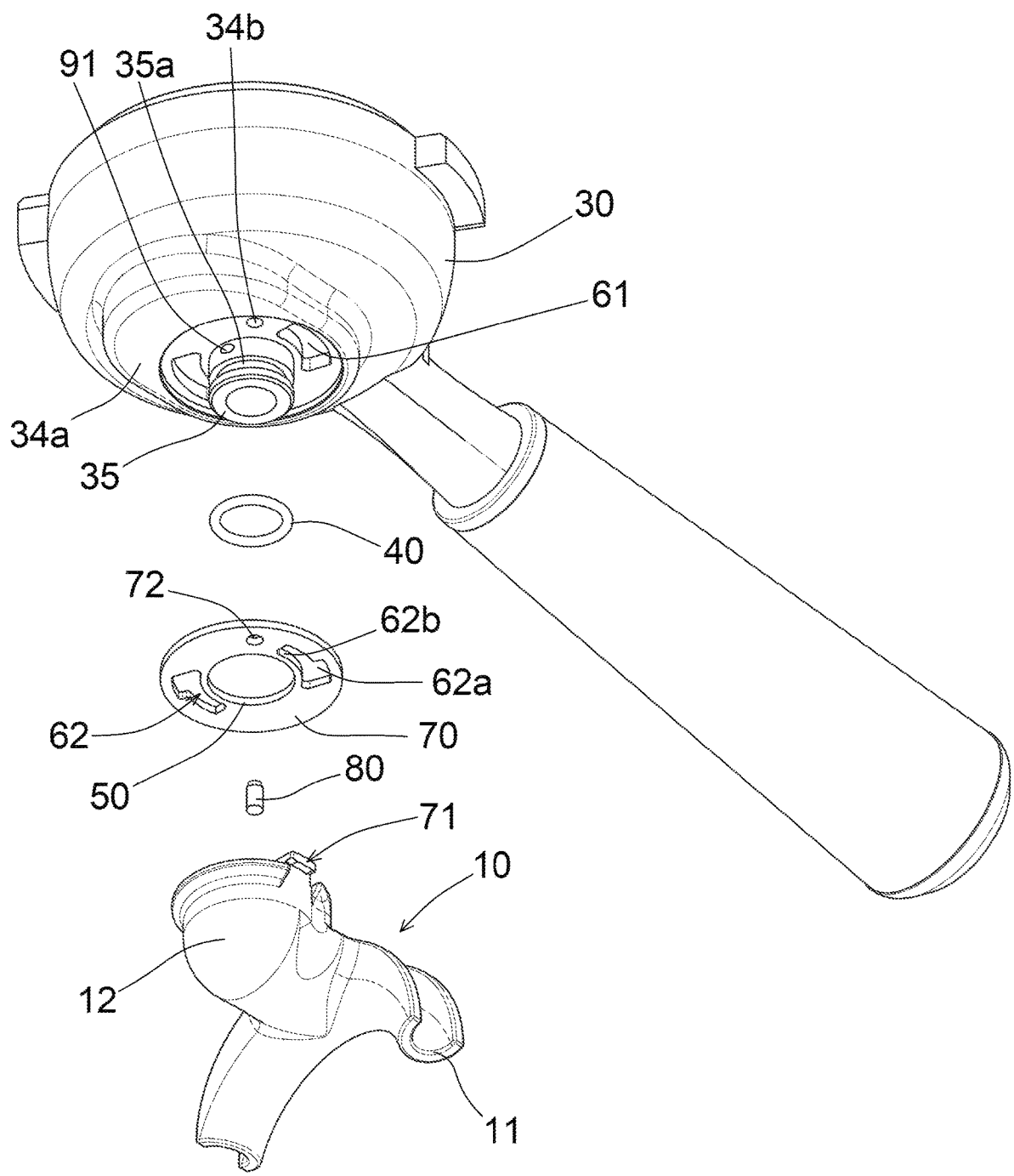
FIG. 2 is a three-dimensional exploded bottom view of all the components of the improved filter holder according to the invention.

As shown in FIGS. 1 and 2, finally, the filter holder (3) includes at least one pouring device (10) of the beverage, located under the cup-shaped body (30) and provided with at least one pouring spout (11) from which the beverage drips into the cup used by the consumer to drink the espresso coffee.

Figure 3:
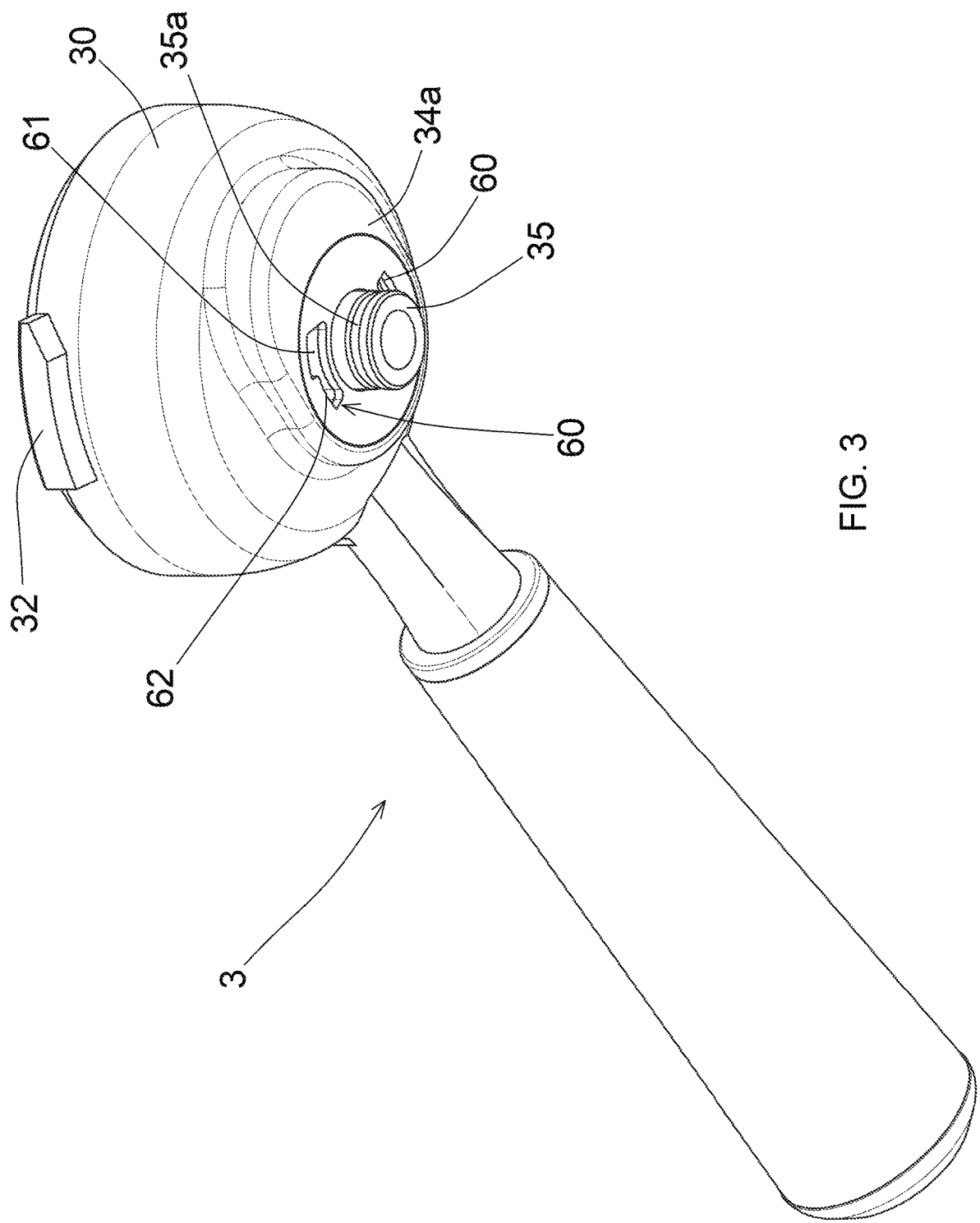
FIG. 3 is a three-dimensional bottom view of the improved filter holder according to the invention, wherein the pouring device is dismounted.

According to a traditional construction technique, said pouring device (10) comprises a cylindrical body (12) suitable for being coupled in male-female coupling mode with the cup-shaped body (30), which is provided in its bottom wall (34) with a discharge nozzle (35) with cylindrical shape that projects vertically from the lower side (34a) of said bottom wall (34), as shown in FIG. 3.

Figure 5:
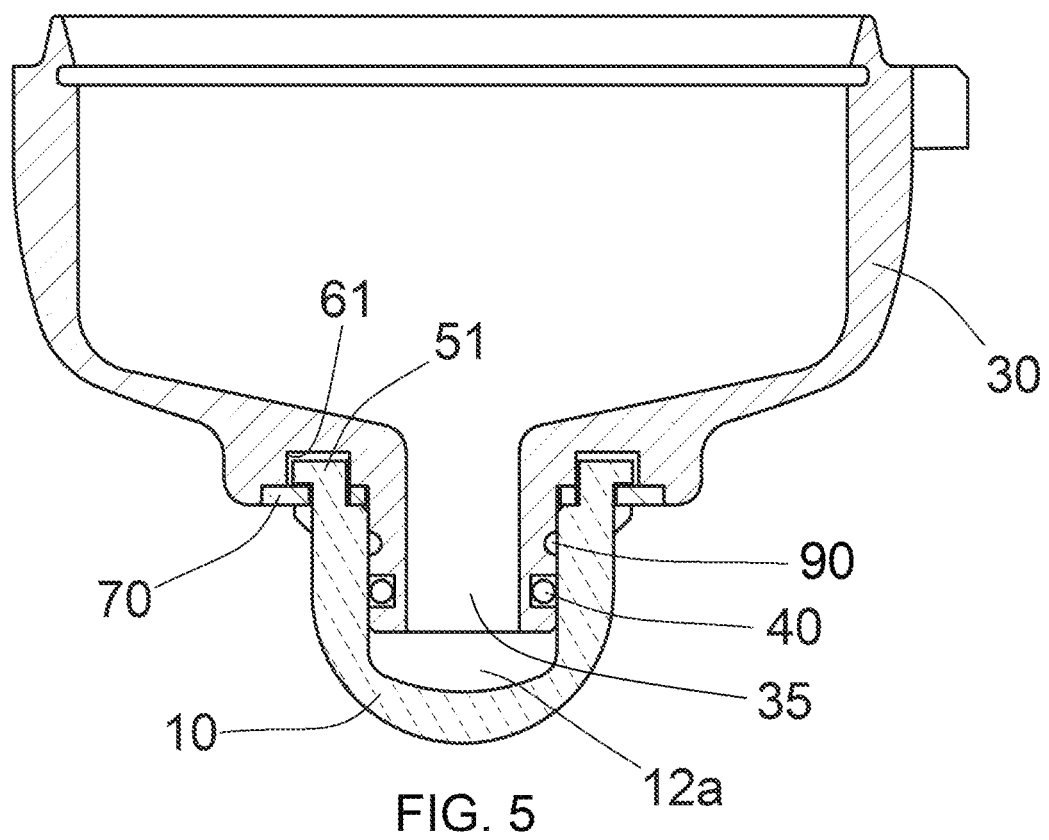
FIG. 5 is a section of the cup-shaped body of the improved filter holder according to the invention with a diametral plane, wherein the pouring device is engaged.
Figure 6:
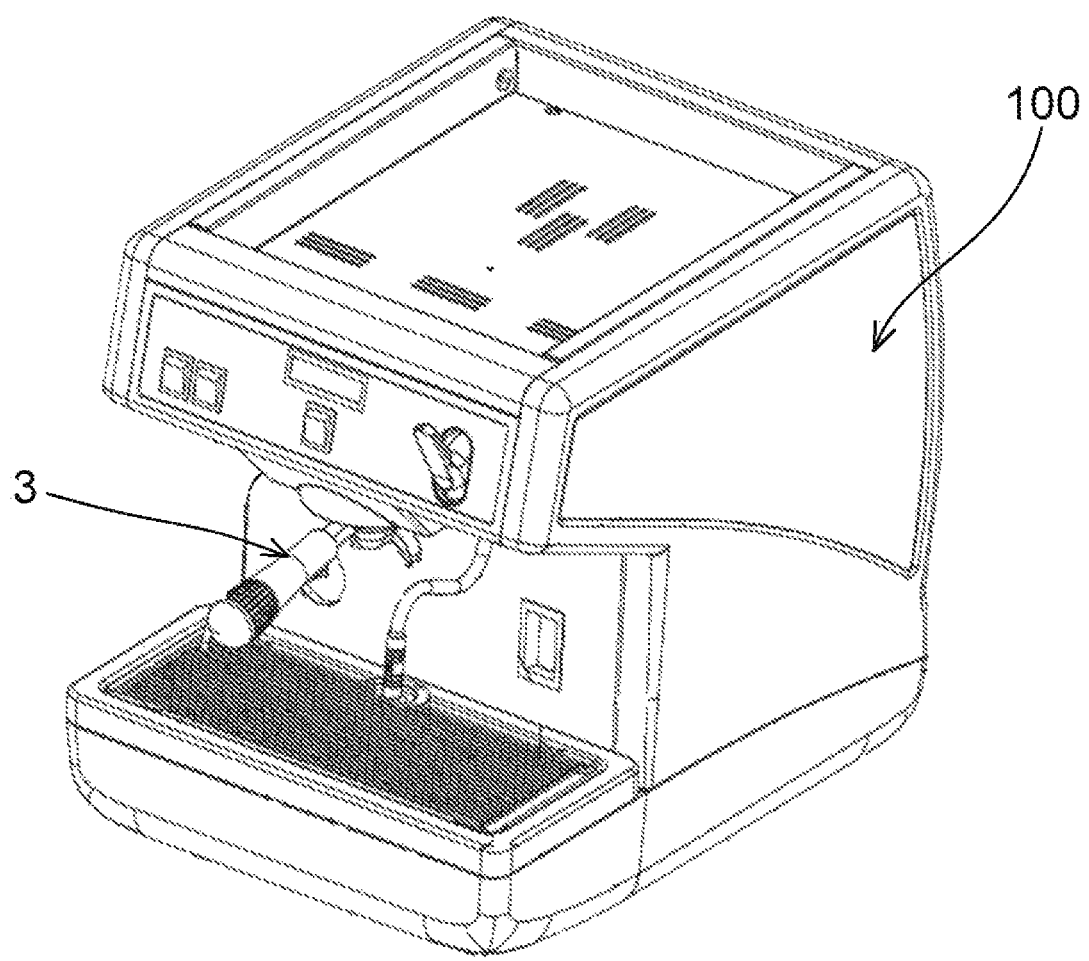
FIG. 6 shows the improved filter holder according to the invention engaged in an espresso coffee machine.

Such a discharge nozzle (35) is exactly inserted into the mouth of said cylindrical body (12), with the interposition of a simple gasket ring (40), as shown in FIG. 5, which is partially recessed in an annular groove (35a) obtained on the outside of said discharge nozzle (35), as shown in FIG. 2.

The inner compartment (12a) of said cylindrical body (12) is in communication with said pouring spout (11), it being configured like an eagle-beak profiled channel with U-shaped cross-section.

As shown in the appended figures, said pouring device (10) comprises an opposite pair of said pouring spouts (11) through which the beverage can be simultaneously poured into a pair of cups.

The filter holder (3) according to the invention is characterized in that it comprises innovative connection means (50, 60) for connecting said pouring device (10) to said cup-shaped body (30).

Said innovative connection means (50, 60) enable a bayonet coupling between the pouring device (10) and the cup-shaped body (30).

Figure 4:
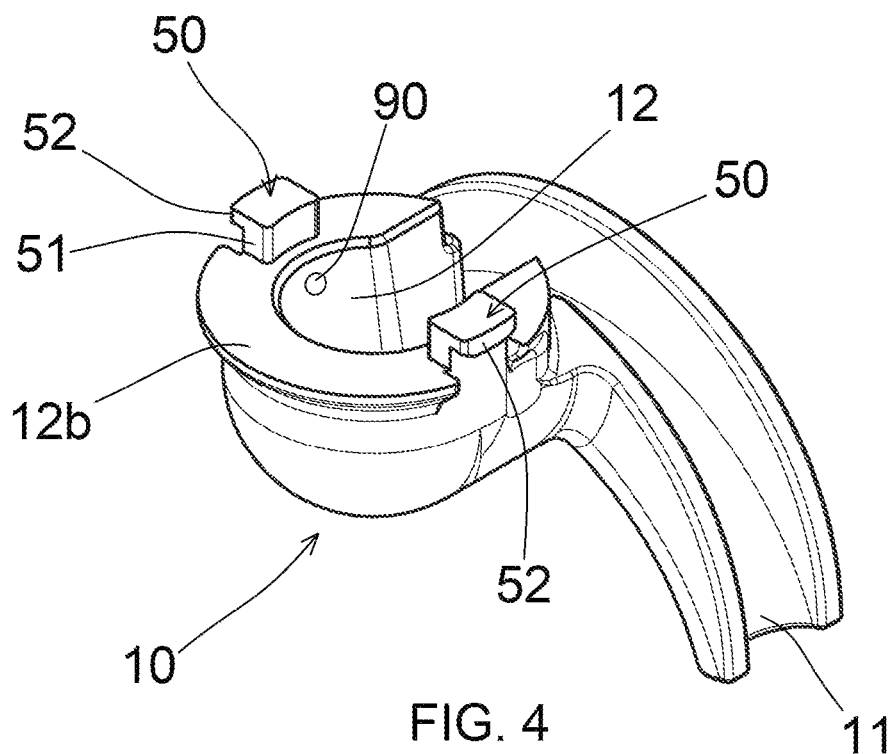
FIG. 4 is a three-dimensional top view of the pouring device adopted in the improved filter holder according to the invention.

More precisely, the connection means (50) provided in said pouring device (10) comprise a diametrically opposed pair of teeth (51) that project from the circular edge (12b) of the mouth of said cylindrical body (12) and terminate at the top with an enlarged head (52), preferably consisting in a tab (52) that projects outward, as shown in FIG. 4.

The connection means (60) provided in the cup-shaped body (30) comprise a pair of curvilinear coupling seats (61) for said teeth (51) obtained in the lower side (34a) of said bottom wall (34) in a diametrically opposite position with respect to the discharge nozzle (35), as shown in FIG. 3.

Each coupling seat (61) has a longitudinal axis developed along a section of an arc of circumference that is concentric to said discharge nozzle (35).

Each coupling seat (61) has an inlet slot (62) shaped like a keyhole and provided with an eye (62a), from which a slot with lower width (62b) begins.

The coupling seat (61) is developed on the back of said inlet slot (62) and is suitable for slidingly receiving each tooth (51), in such a way that, after being inserted into the eye (62a) of the inlet slot (62), the enlarged head (52) is fitted in the back of the inlet slot (62b).

In the preferred embodiment of the invention shown in FIG. 2, said inlet slot (62) is obtained on an annular plate (70) provided with a central hole (71) where the discharge nozzle (35) is inserted, as shown in FIG. 2.

According to such an embodiment, said annular plate (70) is engaged and fixed against the flat lower side (34a) of said bottom wall (34) by means of a small screw (80).

Said screw (80) is inserted through a hole (72) of the annular plate (70) and is screwed into a threaded hole (34b) obtained in the flat lower side (34a) of said bottom wall (34).

In view of the foregoing description, it is easy to understand how the pouring device (10) is coupled to the cup-shaped body (30) of the filter holder (3).

The first operation to be performed is to insert the enlarged head (52) of the teeth (51) of the pouring device (10) into the eye (62a) of the inlet slot (62) of the coupling seats (61).

The second operation to be performed is to rotate the pouring device (10) around the discharge nozzle (35) until the end of the travel, in such a way that the teeth (51) can slide inside said inlet slots (62) and the enlarged heads (52) are fitted on the back of the slots (62b) of the inlet slots (62).

The second operation is performed forcedly due to the frictional action of the gasket ring (40), which is also used to ensure the stable locking of the pouring device (10) at the end of its rotation.

As an additional means to secure the stable locking of said pouring device (10) with respect to said cup-shaped body (30), a fit-in coupling between a retractable tooth and its coupling seat is also preferably provided.

More precisely said fit-in coupling means include:
  a seat (90) shaped like a segment of a sphere located on the inner wall of the mouth of said cylindrical body (12) of the pouring device (10);

a sphere (91) partially embedded in the outer surface of said discharge nozzle (35) and subject to the thrust of an ejection spring housed in the seat that also accommodates said sphere (91), said sphere (91) being suitably dimensioned to be perfectly conjugated with said spherical seat (90) at the end of the engagement travel of the pouring device (10).

The present invention also relates to an espresso coffee machine (100) equipped with the improved filter holder (3) according to the invention.

The espresso coffee machine (100) conventionally comprises:

an electrical system;

a hydraulic system for the production of hot water under pressure;

a beverage dispensing unit, including a filter holder with one or more pouring spouts (11);

a control unit connected to the electrical system, to the hydraulic system and to the beverage dispensing unit in order to control and manage the operation of the espresso coffee machine.

The espresso coffee machine (100) according to the invention is characterized in that it is provided with an improved filter holder (3) such as the one described above.

We claim:

1. A filter holder for an expresso coffee machine, the filter holder comprising:

a cup-shaped body having a circular profile, said cup-shaped body having a bottom wall and a lower side, said cup-shaped body adapted to house a filter;

a discharge nozzle projecting downwardly from a lower side of the bottom wall of said cup-shaped body, said discharge nozzle having a cylindrical shape;

a pouring device having a cylindrical body, said discharge nozzle being inserted into the cylindrical body, said pouring device having at least one pouring spout; and a connector connecting said pouring device to said cup-shaped body, said connection having a bayonet between said pouring device and said cup-shaped body, said connector comprising a first connector on said pouring device and a second connector on said cup-shaped body, the first connector having a pair of teeth, the second connector having a pair of coupling seats that respectively couple to the pair of teeth of said first coupler, the pair of coupling seats being on a lower side of the bottom wall of said cup-shaped body in a diametrically opposite position from a position of said discharge nozzle, each of the pair of coupling seats having a curvilinear shape and longitudinal axis along a section of an arc of the circumference concentric with said discharge nozzle, each coupling seat of the pair of coupling seats having an inlet slot, the inlet slot having a keyhole shape that has an eye opening to a slot, the slot having a width less than a width of the eye, the inlet slot being on an annular plate with a central hole, the central hole receiving said discharge nozzle, the annular plate being stopped and fixed by a screw against the lower side of the bottom wall of said cup-shaped body.

2. The filter holder of claim 1, wherein the pair of teeth are arranged at opposite portions on a circular edge of a mouth of the cylindrical body of said pouring device.

3. The filter holder of claim 1, wherein each of the pair of teeth has an enlarged head.

4. The filter holder of claim 3, wherein the enlarged head has a tab that projects outwardly.

5. The filter holder of claim 1, wherein the screw is inserted through the hole of the annular plate, the screen being screwed into a threaded hole on the lower side of the bottom wall of said cup-shaped body.

6. A filter holder for an expresso coffee machine, the filter holder comprising:

a cup-shaped body having a circular profile, said cup-shaped body having a bottom wall and a lower side, said cup-shaped body adapted to house a filter;

a discharge nozzle projecting downwardly from a lower side of the bottom wall of said cup-shaped body, said discharge nozzle having a cylindrical shape;

a pouring device having a cylindrical body, said discharge nozzle being inserted into the cylindrical body, said pouring device having at least one pouring spout; and a connector connecting said pouring device to said cup-shaped body, said connection having a bayonet between said pouring device and said cup-shaped body, wherein the coupler comprises a fit-in coupler locking said pouring device to said cup-shaped body.

7. The filter holder of claim 6, wherein the fit-in coupler comprises:

a spherical seat on an inner wall of a mouth of the cylindrical body of said pouring device; and a sphere partially recessed in said spherical seat in an external surface of said discharge nozzle, said sphere being urged by a spring housed in said spherical seat.

8. The filter holder of claim 1, wherein the express coffee machine has an electrical system, a water system that supplies pressurized hot water, a beverage dispensing unit and a control unit connected to the electrical system and to the water system and to the beverage dispensing unit, the control unit adapted to control and manage an operation of the expresso coffee machine.

\* \* \* \* \*